(12) United States Patent
Chrisp et al.

(10) Patent No.: US 7,016,037 B2
(45) Date of Patent: Mar. 21, 2006

(54) IMAGING SPECTROMETER UTILIZING IMMERSED GRATINGS WITH ACCESSIBLE ENTRANCE SLIT

(75) Inventors: Michael P. Chrisp, Danville, CA (US); Scott A. Lerner, Corvallis, OR (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 10/877,622

(22) Filed: Jun. 24, 2004

(65) Prior Publication Data

US 2005/0073680 A1    Apr. 7, 2005

Related U.S. Application Data

(63) Continuation-in-part of application No. 10/680,788, filed on Oct. 6, 2003.

(51) Int. Cl.
*G01J 3/28* (2006.01)

(52) U.S. Cl. ....................................... 356/328
(58) Field of Classification Search ............... 356/305, 356/326, 328, 334
See application file for complete search history.

(56) References Cited

U.S. PATENT DOCUMENTS

| | | | |
|---|---|---|---|
| 5,127,728 | A | 7/1992 | Warren et al. |
| 5,717,487 | A | 2/1998 | Davies |
| 5,781,290 | A | 7/1998 | Bittner et al. |
| 5,880,834 | A | 3/1999 | Chrisp |
| 6,078,048 | A | 6/2000 | Stevens et al. |
| 6,100,974 | A | 8/2000 | Reininger |
| 6,266,140 | B1 | 7/2001 | Xiang et al. |
| 2002/0135770 | A1 | 9/2002 | Lewis et al. |

*Primary Examiner*—F. L. Evans
(74) *Attorney, Agent, or Firm*—Eddie E. Scott; Alan H. Thompson

(57) ABSTRACT

A compact imaging spectrometer comprises an entrance slit, a catadioptric lens with a mirrored surface, a grating, and a detector array. The entrance slit directs light to the mirrored surface of the catadioptric lens; the mirrored surface reflects the light back through the lens to the grating. The grating receives the light from the catadioptric lens and diffracts the light to the lens away from the mirrored surface. The lens transmits the light and focuses it onto the detector array.

7 Claims, 6 Drawing Sheets ns, organic and inorganic compounds, living plants, man,
IMAGING SPECTROMETER UTILIZING IMMERSED GRATINGS WITH ACCESSIBLE ENTRANCE SLIT

CROSS-REFERENCE TO RELATED APPLICATIONS

This application is a Continuation-in-Part of U.S. patent application Ser. No. 10/680,788 filed Oct. 6, 2003 titled, "Compact Catadioptric Imaging Spectrometer Utilizing Reflective Grating." U.S. patent application Ser. No. 10/680,788 filed Oct. 6, 2003 titled, "Compact Catadioptric Imaging Spectrometer Utilizing Reflective Grating" is incorporated herein by this reference.

The United States Government has rights in this invention pursuant to Contract No. W-7405-ENG-48 between the United States Department of Energy and the University of California for the operation of Lawrence Livermore National Laboratory.

BACKGROUND

1. Field of Endeavor

The present invention relates to a spectrometer and more particularly to a compact catadioptric imaging spectrometer.

2. State of Technology

U.S. Pat. No. 5,717,487 issued Feb. 10, 1998 to Donald W. Davies, and assigned to TRW Inc., provides the following state of technology information, "A spectrometer is a known instrument for examining the spectral characteristics of light. Light emitted from or reflected by an object is received within the spectrometer and separated into its spectral components, such as the red, green and blue colored spectra as occurs in equal intensity when standard white light is so analyzed. The intensity of each such spectral component of that received light may be readily observed and measured. Each element of nature, molecular components, organic and inorganic compounds, living plants, man, animal and other substances is known to emit a unique spectrum that may be used as an indicium to identify the emitter. In past scientific work, the spectral analyses of a host of known elements, molecules, materials, living plants, gases and the like, has been compiled into a library. That library enables objects and things to be identified solely by the spectrometric analysis of the light reflected therefrom. Thus, as example, by examining the spectral content of light reflected from the distant planets, astronomers identified the constituent elements, such as iron, forming those planets; by examining the spectral content of Gases emitted by factory smokestacks, scientists determine if pollutants are being emitted in violation of law or regulation; by examining the spectral content of land, the environmental engineer is able to determine the botanical fertility of a region and its mineral content, and, with subsequent observations, to determine the change in the environment with time; and by examining the spectral content of light reflected in multiple scans over a geographic region, military personnel identify camouflaged military equipment, separate from plant life, in that geographic region. The foregoing represent but a small number of the many known uses of this useful scientific tool."

U.S. patent application Ser. No. 20020135770 published Sep. 26, 2003 by E. Neil Lewis and Kenneth S. Haber for a Hybrid Imaging Spectrometer, provides the following state of technology information, "Imaging spectrometers have been applied to a variety of disciplines, such as the detection of defects in industrial processes, satellite imaging, and laboratory research. These instruments detect radiation from a sample and process the resulting signal to obtain and present an image of the sample that includes spectral and chemical information about the sample."

U.S. Pat. No. 6,078,048 issued Jun. 20, 2000 to Charles G. Stevens and Norman L. Thomas for an immersion echelle spectrograph, assigned to The Regents of the University of California, provides the following state of technology information, "In recent years substantial effort has been directed to the problem of detection of airborne chemicals. The remote detection of airborne chemicals issuing from exhaust stacks, vehicle exhaust, and various exhaust flumes or plumes, offers a non-intrusive means for detecting, monitoring, and attributing pollution source terms. To detect, identify, and quantify a chemical effluent, it is highly desirable to operate at the limiting spectral resolution set by atmospheric pressure broadening at approximately 0.1 cm.sup.-1. This provides for maximum sensitivity to simple molecules with the narrowest spectral features, allows for corrections for the presence of atmospheric constituents, maximizing species selectivity, and provides greater opportunity to detect unanticipated species. Fourier transform spectrometers, such as Michelson interferometers, have long been the instrument of choice for high resolution spectroscopy in the infrared spectral region. This derives from its advantage in light gathering power and spectral multiplexing over conventional dispersive spectrometers. For remote sensing applications and for those applications in hostile environments, the Fourier transform spectrometer, such as the Michelson interferometer, is ill suited for these applications due to the requirements for keeping a moving mirror aligned to better than a wavelength over the mirror surface. Furthermore, this spectrometer collects amplitude variations over time that are then transformed into frequency information for spectral generation. Consequently, this approach requires stable radiation sources and has difficulty dealing with rapidly changing reflectors or emissions as generally encountered in remote field observations, particularly from moving observation platforms. Furthermore, under conditions where the noise terms are dominated by the light source itself, the sensitivity of the instrument is limited by the so-called multiplex disadvantage."

U.S. Pat. No. 5,880,834 issued Mar. 9, 1999 to Michael Peter Chrisp for a convex diffraction grating imaging spectrometer, assigned to The United States of America as represented by the Administrator of the National Aeronautics and Space Administration, provides the following state of technology information, "There are three problems in designing an imaging spectrometer where light in a slice of an image field passing through an entrance slit is to be diffracted by a grating parallel to the slit and imaged onto a focal plane for display or recording with good spatial resolution parallel to the slit and good spectral resolution perpendicular to the slit: 1. Eliminating astigmatism over the spectrum on the image plane. 2. Removing field curvature from the spectrum focused onto the image plane. 3. Obtaining good spatial resolution of the entrance slit which involves eliminating astigmatism at different field angles from points on the entrance slit."

SUMMARY

Features and advantages of the present invention will become apparent from the following description. Applicants are providing this description, which includes drawings and examples of specific embodiments, to give a broad representation of the invention. Various changes and modifications within the spirit and scope of the invention will become apparent to those skilled in the art from this description and by practice of the invention. The scope of the invention is not intended to be limited to the particular forms disclosed and the invention covers all modifications, equivalents, and alternatives falling within the spirit and scope of the invention as defined by the claims.

The present invention provides a compact imaging spectrometer. The spectrometer comprises an entrance slit, a catadioptric lens, a grating, and a detector array. The entrance slit directs light to the catadioptric lens; the mirrored surface in the lens receives the light and reflects the light back out of the lens to the grating. The grating receives the light from the lens and diffracts the light back to another portion of the lens. The lens then transmits and focuses the light onto the detector array.

Small size for an imaging spectrometer is extremely important because it determines the requirements for the cryogenic cooling. For example, if the spectrometer is small it can fly in a small UAV. Also, if the spectrometer is small it is person portable. In one embodiment of the compact imaging spectrometer, the spectrometer has a front and a back. The entrance slit is located at or near the font and the detector is located at or near the back. The entrance slit, the mirror, the lens, the grating, and the detector array fit within an envelope located between the front and the back. In one embodiment the envelope is 71 mm long or smaller by 43 mm diameter or smaller.

The imaging spectrometer of the present invention has many uses. Examples of its use include use in Homeland Defense to check for the presence of biological or chemical weapons without entering the contaminated areas. The imaging spectrometer also has use for commercial remote sensing where portability is important. The imaging spectrometer can be used for pollution detection and remote sensing of agricultural crops. It can be used for geological identification and for the remote monitoring of industrial processes. These are examples of the various potential applications of the imaging spectrometer of the present invention. The invention is not intended to be limited to the particular uses disclosed and the invention covers all uses falling within the spirit and scope of the invention as defined by the claims.

In one embodiment of the compact imaging spectrometer, the mirror surface is part of the lens. The entrance slit directs light to the lens and to the mirrored surface. The mirrored surface receives the light and reflects the light to the grating. The grating receives the light from the mirrored surface and diffracts the light onto the lens. The lens focuses the light onto the detector array.

Another embodiment of the compact imaging spectrometer includes a second lens. The entrance slit directs light to the mirrored surface in the lens. The mirrored surface receives the light and reflects the light to the grating. The grating receives the light from the mirrored surface and diffracts the light through the lens to the second lens. The second lens focuses the light onto the detector array.

The invention is susceptible to modifications and alternative forms. Specific embodiments are shown by way of example. It is to be understood that the invention is not limited to the particular forms disclosed. The invention covers all modifications, equivalents, and alternatives falling within the spirit and scope of the invention as defined by the claims.

BRIEF DESCRIPTION OF THE DRAWINGS

The accompanying drawings, which are incorporated into and constitute a part of the specification, illustrate specific embodiments of the invention and, together with the general description of the invention given above, and the detailed description of the specific embodiments, serve to explain the principles of the invention.

DETAILED DESCRIPTION OF THE INVENTION

Figure 1:
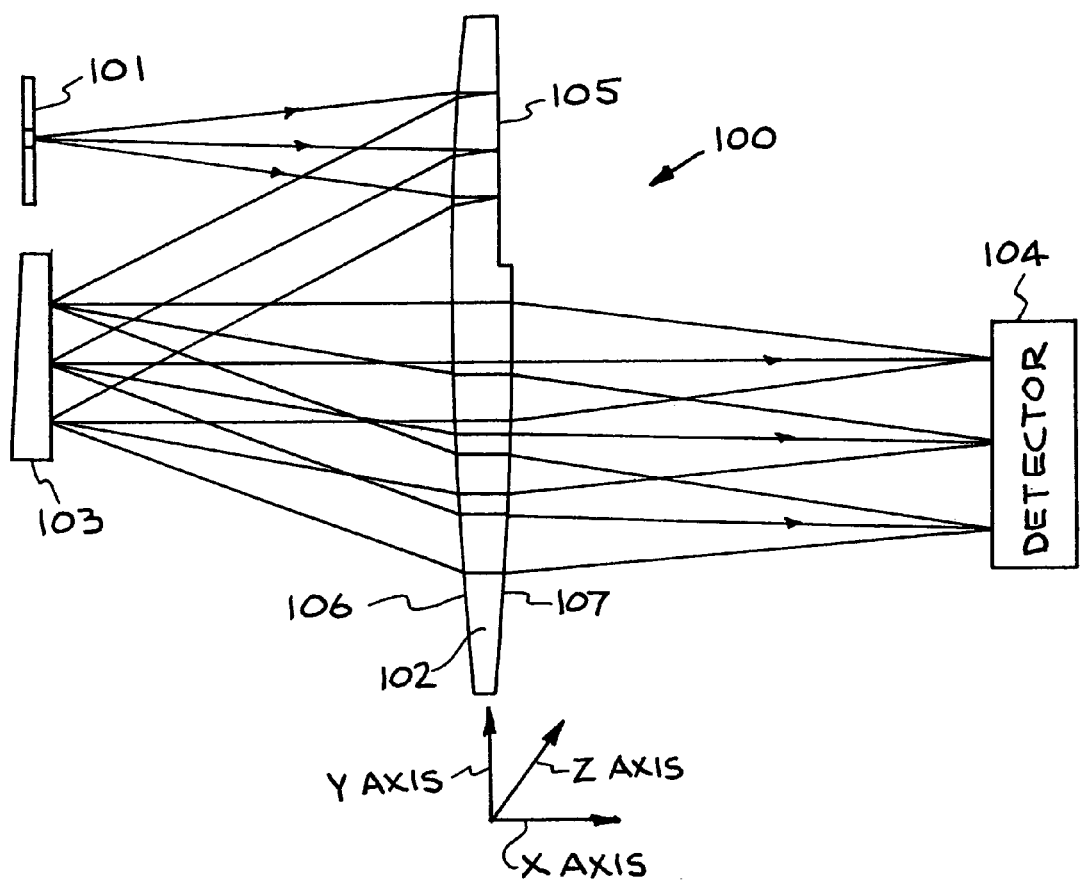
FIG. 1 is a raytrace illustrating an embodiment of a compact imaging spectrometer constructed in accordance with the present invention with a round aperture stop.

Referring now to the drawings, to the following detailed description, and to incorporated materials, detailed information about the invention is provided including the description of specific embodiments. The detailed description serves to explain the principles of the invention. The invention is susceptible to modifications and alternative forms. The invention is not limited to the particular forms disclosed. The invention covers all modifications, equivalents, and alternatives falling within the spirit and scope of the invention as defined by the claims.

Referring to FIG. 1 of the drawings, an embodiment of a compact imaging spectrometer constructed in accordance with the present invention is illustrated. This embodiment of the present invention is designated generally by the reference numeral 100.

FIG. 1 is a raytrace for the imaging spectrometer 100 with a round pupil. The structural elements of the compact imaging spectrometer 100 include an entrance slit 101, an aspheric catadioptric lens 102 with a flat mirror surface 105, a germanium immersion grating 103, and detector 104.

The light goes from the entrance slit 101 to the lens 102 which transmits it to a mirrored flat surface 105 on the back of the lens 102, then back through the lens 102 that refracts it to the ruled germanium immersion grating 103. The diffracted order then propagates back to the lens 102 which focuses the light onto the 2D detector array 104. On the detector array 104 the wavelength dispersion is in the Y-axis direction and the spatial direction is along the Z-axis.

The germanium grating 103 is a wedged prism that is aspheric on the face and with the grating ruled on the flat reflective side. Baffles are inserted at select locations to meet stray light requirements. The zero order from the grating exits the front face is trapped by a v-shaped baffle.

The catadioptric lens 102 in the spectrometer 100 consists of a rotationally symmetric front surface 106 and an asphere 107 on the back surface. A reflective plano surface is located in a small section of the lens 102 in order to redirect the light back to the grating 103, thereby allowing the slit 101 and focal plane array 104 to be arranged at opposite ends of the optical system which in turn provides a practical packaging advantage for using standard packaged focal plane arrays. The flat surface can be diamond turned into a segment of the lens surface.

The cold stop in the spectrometer 100 is at the germanium grating 103. This ensures that the warm back radiation from outside the spectrometer entrance slit 101 does not reach the detector array 104. This would cause an unacceptable degradation in the signal to noise ratio. The geometry of the spectrometer 100 allows a transmissive cold stop to be used ahead of the grating, for even better thermal background reduction, but this also increases the grating sizes. The stop geometry at the grating enables the input beam at the entrance slit to be telecentric which facilitates its use with the front end telescope system. The output beams on the detector are also telecentric which enables the loosening of the tolerances on the detector angular position and longitudinal position while still meeting the distortion requirements.

The diffraction grating 103 has the rulings immersed into a prism. The grating can be diamond flycut with a blazed profile that will have maximum diffraction efficiency at a desired wavelength. In the spectrometer 100 conventional gratings are used with equally spaced straight rulings on a flat surface. For the diffraction grating 103, light enters from the front germanium surface, which has power, and then passes through the germanium to diffract off the grating rulings at the back surface. The diffracted light then propagates through the prism and out. The grating is cut on the back of a wedged prism. The refractive face of the prism may be spherical or aspherical. For the spectrometer 100 shown the diffraction grating is on a flat surface. For stray light control the angular orientation of the front face is arranged so that its Fresnel reflection misses the detector surface.

The spectrometer 100 is diffraction limited over the infrared wavelength range with excellent spatial and spectral resolutions. The spectral slit curvature has been corrected to less than one tenth of a pixel over the detector arrays. This is the curvature of slit image on the detector at a single wavelength, which is a common problem with imaging spectrometer designs. The spatial mapping distortion has also been corrected to less than one tenth of a pixel over the full wavelength range. This means that the spectrum from a single point in the entrance slit will not wander from the center of a row pixels by less than ±2 microns. Correcting the spectral slit curvature and the spatial mapping distortion with wavelength to less than one tenth of a pixel ensures that the images do not have to be resampled to correct for these effects. The design meets the requirements in Table 1 below.

TABLE 1

| Spectral Range | 7.5–13.5 microns |
|---|---|
| F-number (round or square) | 4 |
| Detector array | 256 spatial × 256 spectral |
| Pixel Size | 40 microns |
| Entrance Slit Length | 10.24 mm |
| Spatial Distortion: | <0.1 pixel (<±2 microns) |
| Change in Spatial Mapping with Wavelength | |
| Spectral Distortion:Spectral Smile | <0.1 pixel (<±2 microns) |
| Optical Performance | Diffraction Limited |
| Ghosting | <0.1% of the primary image |

The imaging spectrometer 100 has a size envelope that is smaller than spectrometers currently in use. The entrance slit 101, flat mirror 105, aspheric lens 102, germanium grating 103, and detector 104 fit within the envelope. The X axis and the Y axis are shown in the plane of the paper. The Z axis extends perpendicular to both the X axis and the Y axis. The envelope is 60 mm by 40 mm by 40 mm or smaller. As shown in FIG. 1, the X axis is 60 mm, the Y axis is 40 mm, and the Z axis is 40 mm. The compact imaging spectrometer 100 has a front and a back. The entrance slit 101 is located at or near the font and the detector 104 is located at or near the back.

The optical prescription for the imaging spectrometer in FIG. 1 is given in TABLE 2. The origin of the global coordinate system is at the center of the lens front face 106, and positive X rotation angles are anti-clockwise about the X axis. The lens 102 and the grating 103 are made from germanium, and the grating period is 0.01863 mm. All the powered surfaces are convex, and the sagittal equation of the rotationally symmetric aspheric lens surface 107 is given by:

$$z=(y^2/R^2)/(1+\sqrt{1-(1+K)(y^2/R^2)})$$

where R is the radius of curvature and K is the conic constant. This is an example of a typical design prescription.

TABLE 2

| FIG. 1 reference | Surface notes | Y (mm) | Z (mm) | X angle (degrees) | Radius (mm) | Conic constant |
|---|---|---|---|---|---|---|
| 101 | slit | 14.06 | −27 | | | |
| 106 | lens front surface | 0 | 0 | 0 | 189.493 | |
| 105 | lens mirror surface | 14 | 2.6 | 0 | flat | |
| 107 | lens back surface | 0 | 3.5 | 0 | −184.029 | −9.538 |
| 103 | grating front surface | −0.57 | −25.38 | 0.369 | −1088.34 | |
| 103 | grating ruled surface | −0.58 | −27.78 | −1.751 | flat | |
| 104 | detector surface | −5.09 | 33.91 | −0.466 | flat | |

Figure 2:
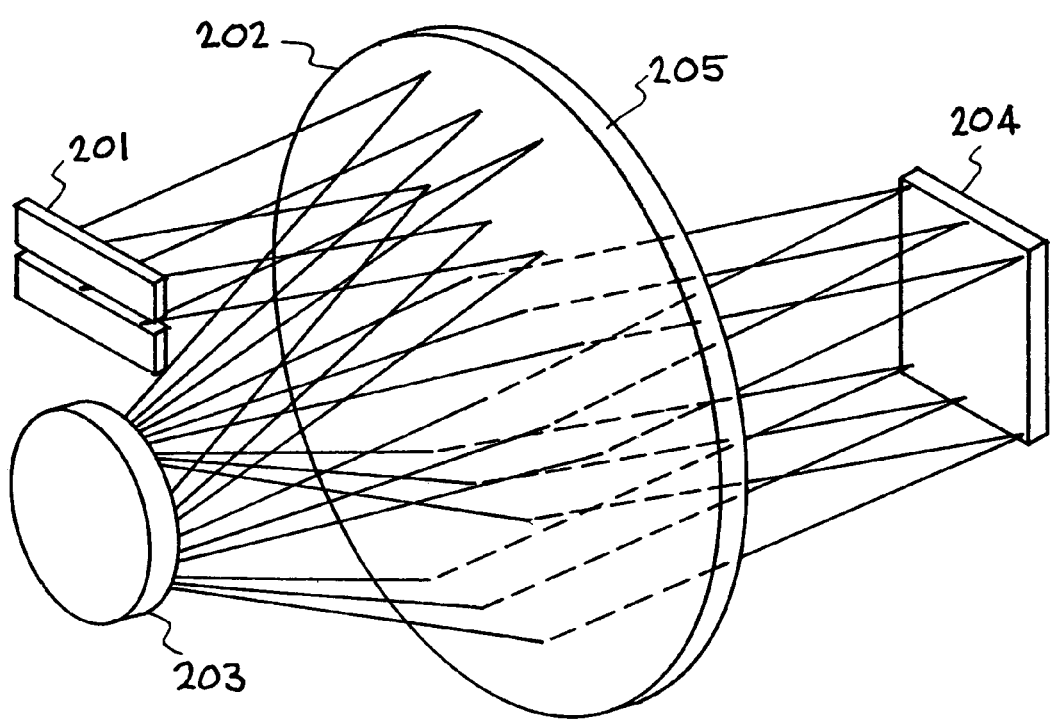
FIG. 2 is a perspective view of the raytrace of the compact imaging spectrometer shown in FIG. 1.

Referring to FIG. 2, a raytrace of a compact imaging spectrometer with a round pupil is shown. This is a perspective view of FIG. 1. This embodiment of the present invention is designated generally by the reference numeral 200. The structural elements of the compact imaging spectrometer 200 include an entrance slit 201, an aspheric catadioptric lens 202 with a flat mirror surface 205, a germanium immersion grating 203, and detector 204.

Light goes from the entrance slit 201 to the lens 202 which transmits it to a mirrored flat surface 205 on the back of the lens 202, then back through the lens 202 that refracts it to the ruled germanium immersion grating 203. The diffracted order then propagates back to the lens 202 which focuses the light onto the 2D detector array 204. The germanium grating 203 is a wedged prism that is aspheric on the face and with the grating ruled on the flat reflective side. Baffles are inserted at select locations to meet stray light requirements.

The catadioptric lens 202 in the spectrometer 200 consists of a rotationally symmetric front surface and an asphere on the back surface. A reflective plano surface is located in a small section of the lens 202 in order to redirect the light the grating 103, thereby allowing the slit 101 and focal plane array 104 to be arranged at opposite ends of the optical system which in turn provides a practical packaging advantage for using standard packaged focal plane arrays. The flat surface can be diamond turned into a segment of the lens surface.

The cold stop in the spectrometer 200 is at the germanium grating 203. This ensures that the warm back radiation from outside the spectrometer entrance slit 201 does not reach the detector array 204. This would cause an unacceptable degradation in the signal to noise ratio. The geometry of the spectrometer 200 allows a transmissive cold stop to be used ahead of the grating, for even better thermal background reduction, but this also increases the grating sizes.

The diffraction grating 203 has the rulings immersed into a prism. The grating can be diamond flycut with a blazed profile that will have maximum diffraction efficiency at a desired wavelength. In the spectrometer 200 conventional gratings are used with equally spaced straight rulings on a flat surface. For the diffraction grating 203, light enters from the front germanium surface, which has power, and then passes through the germanium to diffract off the grating rulings at the back surface. The diffracted light then propagates through the prism and out. The grating is cut on the back of a wedged prism. The refractive face of the prism may be spherical or aspherical. For the spectrometer 200 shown the diffraction grating is on a flat surface.

Figure 3:
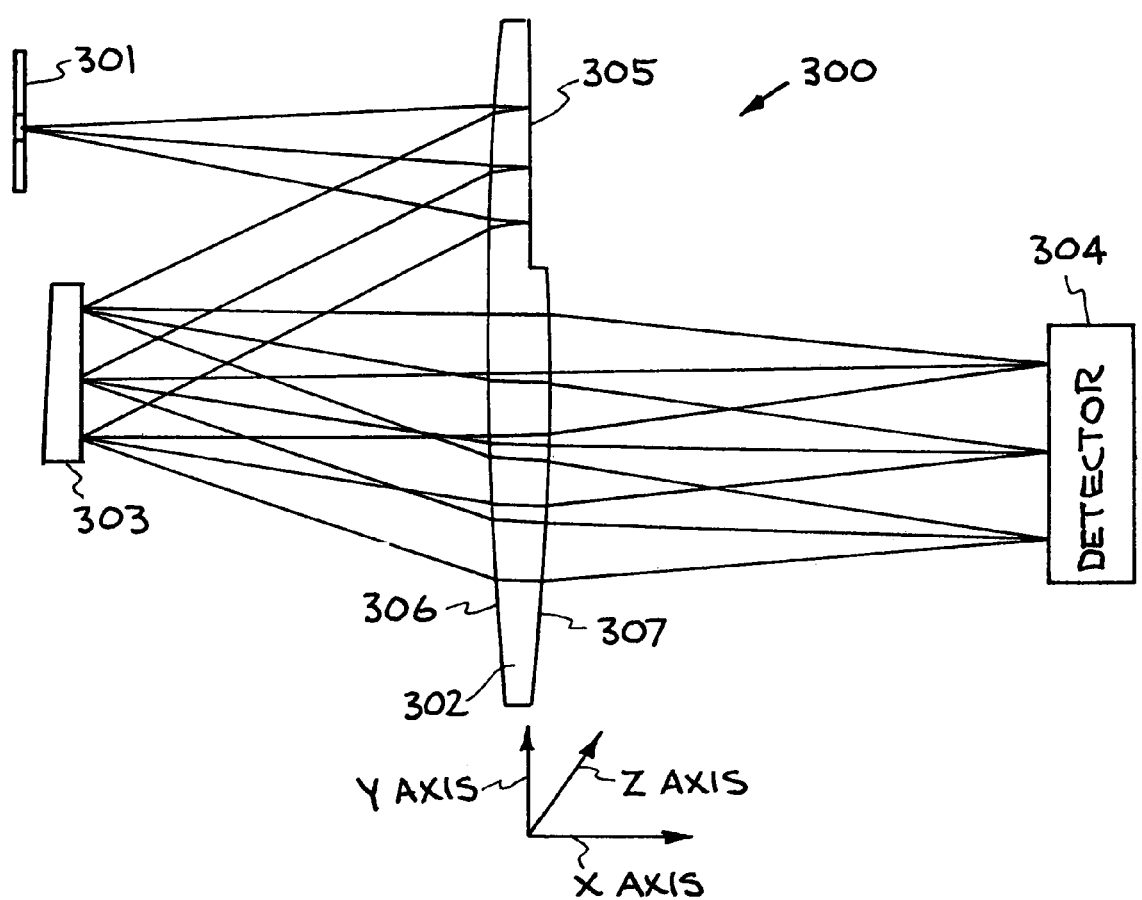
FIG. 3 is a raytrace illustrating an embodiment of a compact imaging spectrometer constructed in accordance with the present invention with a square aperture stop.

Referring to FIG. 3, another embodiment of a compact imaging spectrometer with a square pupil constructed in accordance with the present invention is illustrated. This embodiment of the present invention is designated generally by the reference numeral 300. FIG. 3 is a raytrace of the imaging spectrometer 300 with a square pupil. The differences between the round pupil embodiment illustrated in FIG. 1 and the square pupil imaging spectrometer 300 is the curvature of the grating front surface—spherical for the round pupil, aspherical for the square pupil. In comparison, the square pupil provides larger etendue while the round pupil requires a simpler spherical surface versus the aspheric surface on the grating. The square pupil also reduces the amount of aliasing of the spectrum sampled by the detector array.

The imaging spectrometer 300 has applicable to a wide range of focal plane array formats, scaled accordingly to accommodate different focal plane array physical dimensions. The imaging spectrometer 300 is also adaptable to a modest range of F-numbers, as suitable optical solutions have been obtained for an F/3 point design.

The imaging spectrometer 300 has use for Homeland Defense to check for the presence of biological or chemical weapons without entering the contaminated areas. The imaging spectrometer 300 also has use for commercial remote sensing where portability is important. The imaging spectrometer 300 can be used for pollution detection, and remote sensing of agricultural crops, and geological identification among the various potential applications. The imaging spectrometer 300 can be used for the remote monitoring of industrial processes.

The structural elements of the compact imaging spectrometer 300 include an entrance slit 301, an aspheric catadioptric lens 302 with a flat mirror surface 105, a germanium immersion grating 303, and detector 304.

The light goes from the entrance slit 301 to the lens 302 which transmits it to a mirrored flat surface 305 on the back of the lens 302, then back through the lens 302 that refracts it to the ruled germanium immersion grating 303. The diffracted order then propagates back to the lens 302 which focuses the light onto the 2D detector array 304. On the detector array 104 the wavelength dispersion is in the Y-axis direction and the spatial direction is along the Z-axis.

The germanium grating 103 is a wedged prism that is aspheric on the face and with the grating ruled on the flat reflective side. Baffles are inserted at select locations to meet stray light requirements.

The catadioptric lens 302 in the spectrometer 300 consists of a rotationally symmetric front surface 306 and an asphere 307 on the back surface. A reflective piano surface is located in a small section of the lens 302 in order to redirect the light back to the grating 103, thereby allowing the slit 101 and focal plane array to be arranged at opposite ends of the optical system which in turn provides a practical packaging advantage for using standard packaged focal plane arrays. The flat surface can be diamond turned into a segment of the lens surface.

The cold stop in the spectrometer 300 is at the germanium grating 303. This ensures that the warm back radiation from outside the spectrometer entrance slit 301 does not reach the detector array 304. This would cause an unacceptable degradation in the signal to noise ratio. The geometry of the spectrometer 300 allows a transmissive cold stop to be used ahead of the grating, for even better thermal background reduction, but this also increases the grating sizes.

The diffraction grating 303 has the rulings immersed into a prism. The grating can be diamond flycut with a blazed profile that will have maximum diffraction efficiency at a desired wavelength. In the spectrometer 300 conventional gratings are used with equally spaced straight rulings on a flat surface. For the diffraction grating 303, light enters from the front germanium surface, which has power, and then passes through the germanium to diffract off the grating rulings at the back surface. The diffracted light then propagates through the prism and out. The grating is cut on the back of a wedged prism. The refractive face of the prism may be spherical or aspherical. For the spectrometer 300 shown the diffraction grating is on a flat surface.

The spectrometer 300 is diffraction limited over the wavelength range with excellent spatial and spectral resolutions. The spectral slit curvature has been corrected to less than one tenth of a pixel over the detector arrays. This is the curvature of slit image on the detector at a single wavelength, which is a common problem with imaging spectrometer designs. The spatial mapping distortion has also been corrected to less than one tenth of a pixel over the full wavelength range. This means that the spectrum from a single point in the entrance slit will not wander from the center of a row of pixels by less than ±2 microns. Correcting the spectral slit curvature and the spatial mapping distortion with wavelength to less than one tenth of a pixel ensures that the images do not have to be resampled to correct for these effects. The design meets the requirements in Table 1 above.

The imaging spectrometer 300 has a size envelope that is smaller than spectrometers currently in use. The entrance slit 301, flat mirror 305, aspheric lens 302, germanium grating 303, and detector 304 fit within the envelope. The X axis and the Y axis are shown in the plane of the paper. The Z axis extends perpendicular to both the X axis and the Y axis. The envelope is 62 mm by 41 mm by 41 mm or smaller. As shown in FIG. 3, the X axis is 62 mm, the Y axis is 41 mm, and the Z axis is 41 mm.

Figure 4:
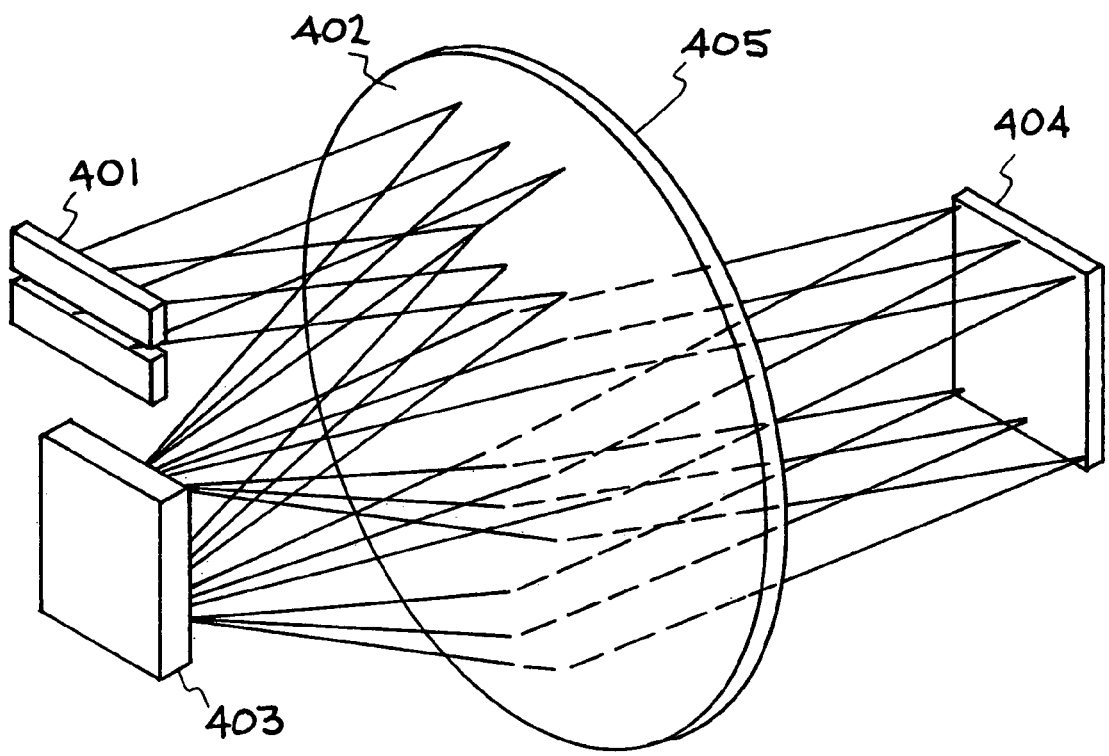
FIG. 4 is a perspective view of the raytrace of the compact imaging spectrometer shown in FIG. 3.

FIG. 4. is a perspective view of the imaging spectrometer in FIG. 3. This embodiment of the present invention is designated generally by the reference numeral 400. The structural elements of the compact imaging spectrometer 400 include an entrance slit 401, an aspheric catadioptric lens 402 with a flat mirror surface 405, a germanium immersion grating 403, and detector 404.

Figure 5:
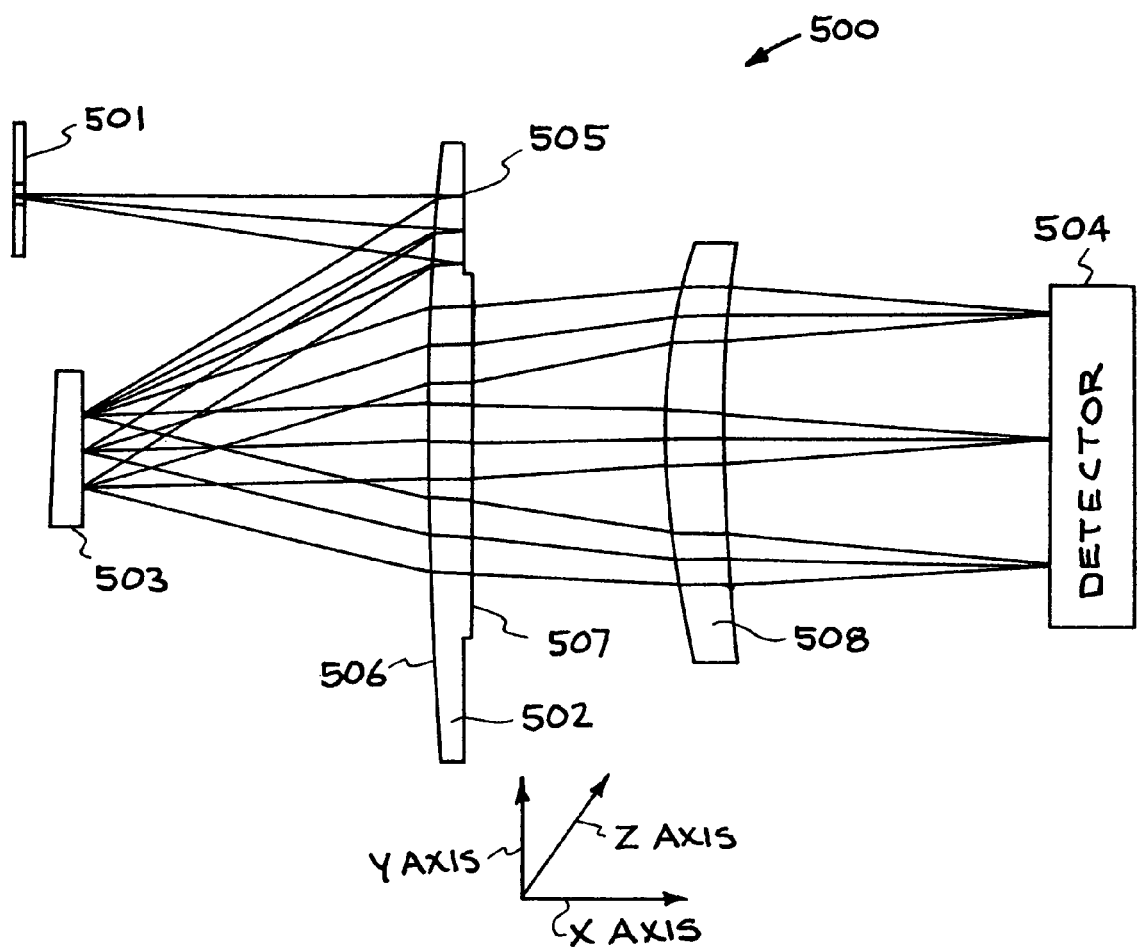
FIG. 5 is a raytrace illustrating another embodiment of a compact imaging spectrometer constructed in accordance with the present invention designed for a large format array in the mid-infrared.

Referring to FIG. 5, another embodiment of a compact imaging spectrometer constructed in accordance with the present invention is illustrated. This embodiment of the present invention is designated generally by the reference numeral 500. FIG. 5 is a raytrace of the imaging spectrometer 500 for midwave infrared covering approximately the 3 to 5 micron band. The imaging spectrometer 500 performance meets all the requirements in Table 3.

TABLE 3

| | |
|---|---|
| Spectral Range | 3.2–5.3 microns |
| F-number (round or square) | 6.5 |
| Detector array | 480 spatial × 640 spectral |
| Pixel Size | 27 microns |
| Entrance Slit Length | 12.96 mm |
| Spatial Distortion: Change in Spatial Mapping with Wavelength | <0.1 pixel (<±1.3 microns) |
| Spectral Distortion:Spectral Smile | <0.1 pixel (<±1.3 microns) |
| Optical Performance | Diffraction Limited |
| Ghosting | <0.1% of the primary image |

The imaging spectrometer 500 has use for Homeland Defense to check for the presence of biological or chemical weapons without entering the contaminated areas. The imaging spectrometer 500 also has use for commercial remote sensing where portability is important. The imaging spectrometer 500 can be used for pollution detection, and remote sensing of agricultural crops, and geological identification among the various potential applications. The imaging spectrometer 500 can be used for the remote monitoring of industrial processes.

The structural elements of the compact imaging spectrometer 500 include an entrance slit 501, an aspheric catadioptric lens 502 with a flat mirror surface 505, a germanium grating 503, and additional lens 508 and detector 504. The light goes from the entrance slit 501 to the lens front surface 506 which transmits it to a mirrored flat surface 505 on the back of the lens 502, then back through the lens surface 506 that refracts it to the ruled germanium immersion grating 503. The diffracted order then propagates back to the lens 502 which focuses the light onto the 2D detector array 504. The light is dispersed spectrally on the detector array in the Y axis direction and the spatially resolved direction is in the Z axis direction.

The germanium grating 503 is a wedged prism that is spherical on the input face and with the grating ruled on the flat reflective side. The cold stop is at the grating, which provides the advantage of a telecentric input beam at the exit slit and a telecentric exit beam at the detector. The angular position of the front face of the grating is set so that the Fresnel reflection falls outside the detector area. Baffles are inserted at select locations to meet stray light requirements. The zero order from the grating exits from the front face of the prism and is trapped by a baffle.

In the imaging spectrometer 500, the grating 503 and the catadioptric lens 502 are germanium, and the final lens 508 is zinc selenide. The mirror annulus 505 can be diamond turned at the same time as the powered back lens surface is turned. For greater compactness a flat segment on the lens can be flycut instead of the annulus going completely around the lens. The additional zinc selenide lens 508 provided additional performance to meet the tighter requirements of the large format array with the smaller pixel sizes. The imaging spectrometer 500 is diffraction limited at all wavelengths and meets the spatial and spectral distortion requirements over the full detector area.

The imaging spectrometer 600 has a size envelope that is smaller than spectrometers currently in use. The entrance slit 601, flat mirror 605, aspheric lens 602, germanium grating 603, the lens 60-8, and detector 604 fit within the envelope. The X axis and the Y axis are shown in the plane of the paper. The Z axis extends perpendicular to both the X axis and the Y axis. The envelope is 71 mm by 43 mm by 43 mm or smaller. As shown in FIG. 5, the X axis is 71 mm, the Y axis is 43 mm, and the Z axis is 43 mm.

Figure 6:
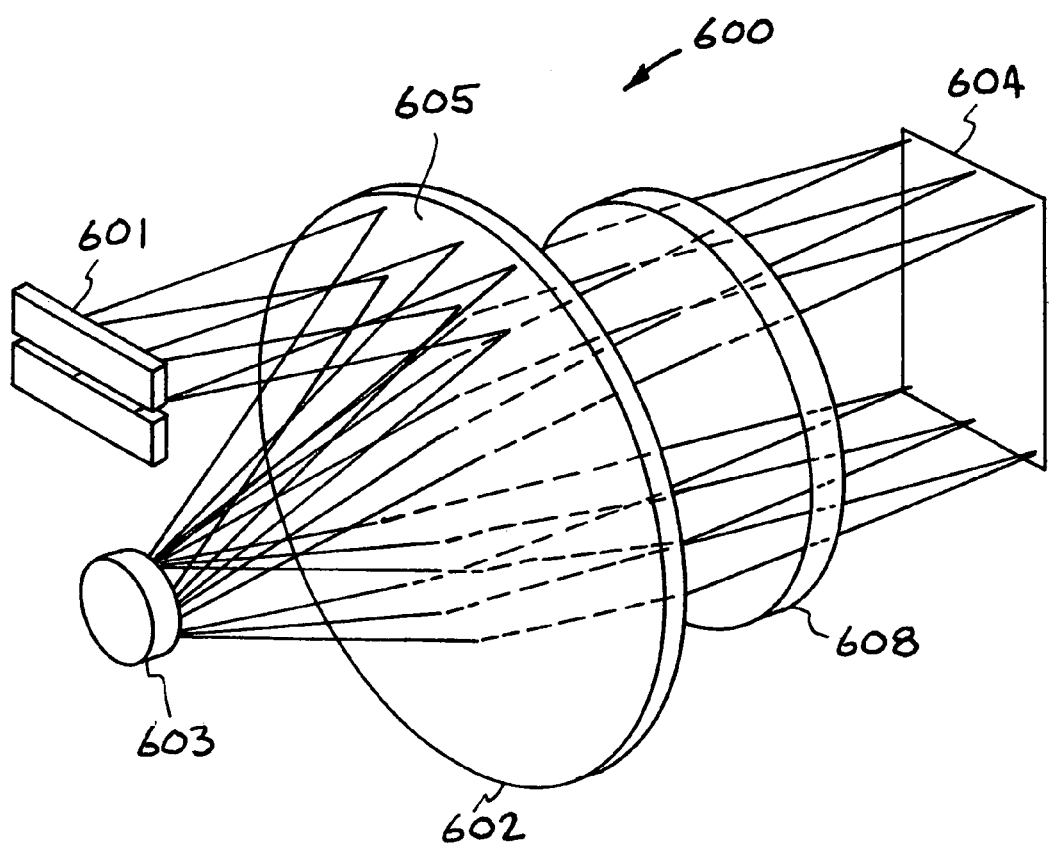
FIG. 6 is a perspective view of the raytrace of the compact imaging spectrometer shown in FIG. 5.

Referring to FIG. 6, is the perspective view of the imaging spectrometer in FIG. 5. This embodiment of the present invention is designated generally by the reference numeral 600. The imaging spectrometer 600 is for midwave infrared covering approximately the 3 to 5 micron band. The imaging spectrometer 600 has use in checking for the presence of biological or chemical weapons, in commercial remote sensing, in pollution detection, in remote sensing of agricultural crops, in geological identification, in the remote monitoring of industrial processes, and other sensing.

The structural elements of the compact imaging spectrometer 600 include an entrance slit 601, a flat mirror 605, an aspheric lens 602, a germanium grating 603, a zinc selenide lens 608, and detector 604. The light goes from the entrance slit 601 to the lens 602 which transmits it to a mirrored flat surface 605 on the back of the lens 602, then back through the lens 602 that refracts it to the ruled germanium immersion grating 603. The diffracted order then propagates back through the lens 602 to the zinc selenide lens 608. The zinc selenide lens 608 focuses the light onto the 2D detector array 604.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A compact imaging spectrometer apparatus, comprising:
    an entrance slit,
    a catadioptric lens with a mirrored surface,
    an immersed diffraction grating, and
    a detector array,
    said entrance slit, said catadioptric lens, said mirrored surface, said immersed diffraction grating, and said a detector array positioned wherein said entrance slit directs light to said catadioptric lens, to said mirrored surface, said mirrored surface receives the light and reflects the light back through said lens to said diffraction grating, said grating receives the light from said lens and diffracts the light back to said lens, and said lens transmits and focuses the light onto said detector array.

2. The compact imaging spectrometer apparatus of claim 1 including an additional lens wherein said entrance slit directs light to said catadioptric lens, to said mirrored surface, said mirrored surface receives the light and reflects the light back out through said catadioptric lens to said diffraction grating, said grating receives the light from said catadioptric lens and diffracts the light to said catadioptric lens, said catadioptric lens focused the light to said additional lens, and said additional lens transmits and focuses the light onto said detector array.

3. The compact imaging spectrometer apparatus of claim 1 including a second lens, wherein said entrance slit directs light to said mirrored surface, said mirrored surface receives the light and reflects the light back out through said catadioptric lens to said grating, said grating receives the light and diffracts the light through said catadioptric lens and to said second lens, and said second lens focuses the light onto said detector array.

4. The compact imaging spectrometer apparatus of claim 1 wherein said grating is reflective and immersed in a prism of wedged refractive material, and wherein the light passes refracts through the front surface of said prism to said grating, said grating diffracts and reflects the light back through said front surface of said prism, said front surface of said prism refracts the light to said lens.

5. The compact imaging spectrometer apparatus of claim 1 wherein said apparatus has a front and a back, and wherein said entrance slit is located at or near said front and said detector array is located at or near said back.

6. The compact imaging spectrometer apparatus of claim 5 wherein said entrance slit, said mirrored surface, said lens, said grating, and said detector array fit within an envelope located between said front and said back.

7. The compact imaging spectrometer apparatus of claim 6 wherein said envelope is 60 mm or smaller by 40 mm or smaller by 40 mm or smaller.

* * * * *